United States Patent
Tsutsui et al.

(10) Patent No.: US 8,866,940 B2
(45) Date of Patent: Oct. 21, 2014

(54) IMAGE PICKUP APPARATUS

(71) Applicant: Olympus Medical Systems Corp., Tokyo (JP)

(72) Inventors: Keisuke Tsutsui, Kawaguchi (JP); Shin Otsuka, Hachioji (JP); Fumiyuki Okawa, Tama (JP); Takayuki Hanawa, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 14/212,244

(22) Filed: Mar. 14, 2014

(65) Prior Publication Data

US 2014/0211049 A1     Jul. 31, 2014

Related U.S. Application Data

(63) Continuation of application No. PCT/JP2013/060726, filed on Apr. 9, 2013.

(30) Foreign Application Priority Data

Apr. 10, 2012  (JP) ................................ 2012-089437

(51) Int. Cl.
  *H04N 5/217*  (2011.01)
  *H04N 9/64*   (2006.01)
  *H04N 5/367*  (2011.01)

(52) U.S. Cl.
  CPC ..................................... *H04N 5/367* (2013.01)
  USPC ............................ 348/246; 348/241; 348/247

(58) Field of Classification Search
  CPC ....... G06T 7/0002; G06T 5/002; G06T 5/005; G06T 7/0012; G06T 7/004; G06T 7/408; H04N 5/367; H04N 5/253; H04N 5/361; H04N 9/045; H04N 5/3675; H04N 5/2176
  USPC ................................ 348/241–251, 45, 65–76
  See application file for complete search history.

(56) References Cited

U.S. PATENT DOCUMENTS 7,206,020 B2 *   4/2007  Kato ............................. 348/247
7,443,433 B2 *  10/2008  Hara ............................. 348/246

(Continued)

FOREIGN PATENT DOCUMENTS

JP   10-042201 A   2/1998
JP   10-051693 A   2/1998

(Continued)

OTHER PUBLICATIONS

International Search Report dated Jun. 4, 2013 issued in PCT/JP2013/060726.

*Primary Examiner* — Timothy J Henn
*Assistant Examiner* — Pritham Prabhakher
(74) *Attorney, Agent, or Firm* — Scully, Scott, Murphy & Presser, PC

(57) ABSTRACT

An image pickup apparatus includes: an image pickup device that outputs pixel signals picked up by a plurality of pixels arranged in a two-dimensional manner for picking up an image of an object; a white spot positional information storage portion that stores positional information of a white-spot pixel that exists in the image pickup device; an image pickup device drive portion; and a white spot correction portion that, based on positional information of the white-spot pixel that is read out from the white spot positional information storage portion, performs correction with respect to the pixel signal of the pixel that is determined to be the white-spot pixel based on a white spot correction value calculated based on seven pixels that surround a pixel that is determined to be the white-spot pixel.

13 Claims, 9 Drawing Sheets

(56) References Cited

U.S. PATENT DOCUMENTS

| | | | |
|---|---|---|---|
| 8,587,701 B2* | 11/2013 | Tatsuzawa | 348/246 |
| 8,593,546 B2* | 11/2013 | Kanemitsu et al. | 348/246 |
| 2003/0043286 A1* | 3/2003 | Kato | 348/246 |
| 2004/0150731 A1* | 8/2004 | Hara | 348/246 |
| 2010/0110240 A1* | 5/2010 | Thebault et al. | 348/246 |
| 2011/0069209 A1* | 3/2011 | Kanemitsu et al. | 348/246 |
| 2012/0050586 A1* | 3/2012 | Kanemitsu et al. | 348/246 |
| 2012/0133804 A1* | 5/2012 | Kim | 348/246 |

FOREIGN PATENT DOCUMENTS

| | | |
|---|---|---|
| JP | 2003-116060 A | 4/2003 |
| JP | 2004-241600 A | 8/2004 |
| JP | 2006-109067 A | 4/2006 |

* cited by examiner

IMAGE PICKUP APPARATUS

CROSS REFERENCE TO RELATED APPLICATION

This application is a continuation application of PCT/JP2013/060726 filed on Apr. 9, 2013 and claims benefit of Japanese Application No. 2012-089437 filed in Japan on Apr. 10, 2012, the entire contents of which are incorporated herein by this reference.

BACKGROUND OF THE INVENTION

1. Field of the Invention

The present invention relates to an image pickup apparatus that performs image processing with respect to an image pickup device that picks up an image of an object.

2. Description of the Related Art

Image pickup devices that pick up an image of an object have been widely used in recent years in image pickup apparatuses such as endoscope apparatuses.

Recently, the number of pixels of image pickup devices has been increasing and miniaturization of image pickup devices has been also progressing, and it is almost impossible to manufacture an image pickup device without pixels that have a defect or pixels that generate noise.

Consequently, many kinds of technology have been proposed that employ image processing to correct defective pixels that generate pixel signals that are different to normal pixels of an image pickup device and also to correct fixed pattern noise.

For example, Japanese Patent Application Laid-Open Publication No. 2003-116060 as a first conventional example discloses technology in which a defective pixel correction portion includes therein a defect position recording ROM that records positional information of a defective pixel that is obtained by performing a prior inspection, and determines a direction in which there is a high correlation based on peripheral pixels of the defective pixel that can be identified based on the defect position recording ROM, and calculates a correction value of the defective pixel using peripheral pixels that belong in the direction in question.

Further, in paragraph [0016] of Japanese Patent Application Laid-Open Publication No. 10-042201 as a second conventional example it is described that "Interpolation is utilized with respect to image information on a same line as a defective pixel using mainly video information on a preceding line and video information on a succeeding line excluding the data of the defective pixel and of a pixel before and after the defective pixel. Since correction is performed using video information on the preceding line and video information on the succeeding line, interpolation is possible with respect to not only the defective pixel but also for signals before and after the defective pixel."

SUMMARY OF THE INVENTION

An image pickup apparatus according to one aspect of the present invention includes: an image pickup device having a plurality of pixels that are arranged in a two-dimensional manner for picking up an image of an object, and which outputs pixel signals that are picked up by the plurality of pixels; a white spot positional information storage portion that stores positional information of a white-spot pixel as a defective pixel that exists in the image pickup device; an image pickup device drive portion that, by applying a transfer signal to the image pickup device, causes the pixel signals to be outputted along a predetermined direction from the plurality of pixels constituting the image pickup device; a white spot correction portion that, when it is determined based on positional information of the white-spot pixel that is read out from the white spot positional information storage portion that the pixel signal that is outputted from the image pickup device by application of the transfer signal is a pixel signal of a white-spot pixel, among pixel signals of eight peripheral pixels that surround a pixel that is determined to be the white-spot pixel that are outputted from the image pickup device, performs white spot correction with respect to a pixel signal of the pixel that is determined to be the white-spot pixel based on a white spot correction value that is calculated based on seven pixels excluding a pixel signal of an adjacent pixel that is outputted one pixel after the pixel that is determined to be the white-spot pixel; a cable that transmits an analog pixel signal of each pixel comprising the image pickup device; an analog/digital conversion portion that converts the analog pixel signal that is transmitted by the cable to a digital pixel signal and outputs the digital pixel signal to the white spot correction portion; and an additive correction portion that performs correction that adds a predetermined proportion of a pixel signal value of the pixel that is determined to be the white-spot pixel to a pixel signal of a predetermined pixel that is outputted a predetermined number of pixels after the pixel that is determined to be the white-spot pixel, with the predetermined number of pixels being greater than or equal to one pixel.

DETAILED DESCRIPTION OF THE PREFERRED EMBODIMENTS

Embodiments of the present invention are described hereunder with reference to the drawings.

First Embodiment

Figure 1:
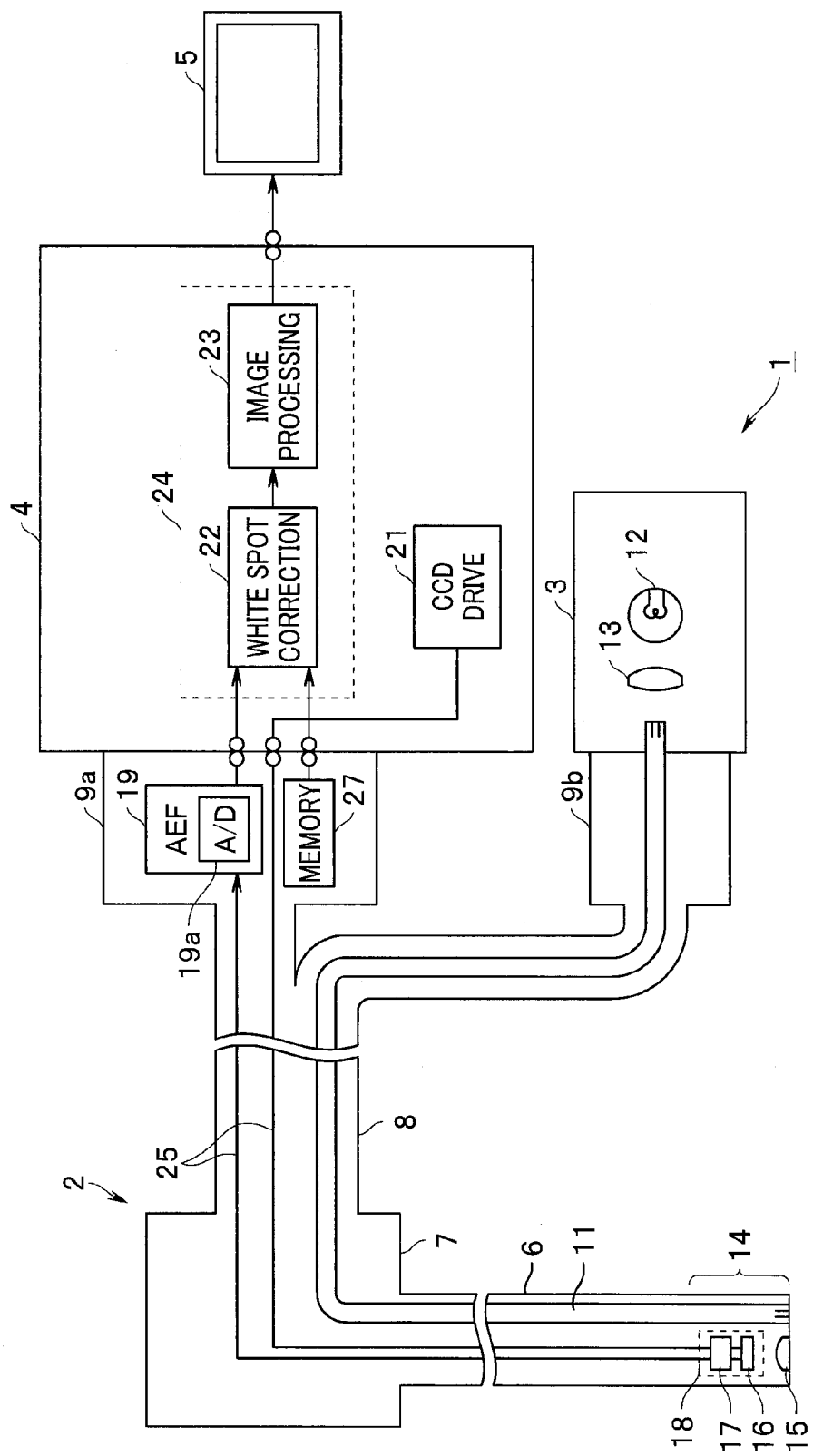
FIG. 1 is a view illustrating the overall configuration of an endoscope apparatus according to a first embodiment of the present invention.

As shown in FIG. 1, an endoscope apparatus 1 according to a first embodiment that constitutes an image pickup apparatus of the present invention includes an electronic endoscope (hereunder, abbreviated as simply "endoscope") 2 for performing endoscopy, a light source apparatus 3 that supplies an illuminating light to the endoscope 2, a processor 4 as a signal processing apparatus (image processing apparatus) that performs signal processing (image processing) with respect to an image pickup device and the like of the endoscope 2, and a monitor 5 as a display apparatus that displays video signals generated by the processor 4.

The endoscope 2 has an insertion portion 6 that is inserted into a body cavity of a patient or the like, an operation portion 7 provided at a proximal end (rear end) of the insertion portion 6, and a cable portion 8 that is extended from the operation portion 7. A light source connector 9b at an end portion of the cable portion 8 is detachably connected to the light source apparatus 3. Further, a signal connector 9a is detachably connected to the processor 4.

Note that the present invention is not limited to a configuration in which the end portion side of the cable portion 8 is forked as shown in FIG. 1, and for example a configuration may also be adopted in which a signal connector at the end portion thereof is detachably connected to the processor 4 through a connection cable from the light source connector. A configuration may also be adopted in which the light source apparatus 3 and the processor 4 are integrated.

Further, an endoscope in which a cable length and the like is different to the endoscope 2 shown in FIG. 1 can also be connected to the processor 4 shown in FIG. 1 and used.

A light guide 11 that transmits an illuminating light is inserted through the inside of the insertion portion 6, the operation portion 7, and the cable portion 8 in the endoscope 2, and the proximal end thereof reaches the light source connector 9b. By connecting the light source connector 9b to the light source apparatus 3 by a user, an illuminating light that is generated by a light source lamp 12 inside the light source apparatus 3 is condensed by a condenser lens 13 and is made incident on a proximal end of the light guide 11.

The illuminating light is transmitted by the light guide 11 and is emitted from an illuminating window of a distal end portion 14 of the insertion portion 6, and illuminates an object such as a diseased part inside the body cavity. An objective lens 15 is mounted to an observation window that is provided adjacent to the illuminating window. An optical image of the illuminated object is formed by the objective lens 15 at an image-formation position thereof. A light receiving surface of a charge coupled device (abbreviated as "CCD") 16 as a solid-state image pickup device (image pickup device) is arranged at the image-formation position, and pixels constituted by photodiodes that have a function for performing photoelectric conversion that are two-dimensionally arranged are formed on the light receiving surface.

Further, inside the distal end portion 14 is arranged a system-in-chip portion (abbreviated as "SIP") 18 in which the CCD 16, an unshown timing generator (TG) that drives the CCD, and a CDS circuit 17 that performs extraction of a signal component with respect to the CCD 16 are embedded in a single package. Further, in the endoscope 2 according to the present embodiment, for example, an analog front end (AFE) 19 which incorporates an A/D conversion circuit 19a as analog/digital conversion means is arranged inside the signal connector 9a.

Inside the processor 4 are provided: a CCD drive portion 21 as image pickup device drive means or an image pickup device drive portion that generates a CCD drive signal (also referred to simply as "drive signal" and "transfer signal for transferring") that drives the CCD 16; and an image processing portion 24 as image processing means that includes a white spot correction circuit 22 as white spot correction means or a white spot correction portion that performs correction (referred to as "white spot correction") for a white spot (or a white-spot pixel) as a defective pixel with respect to a pixel signal that is picked up by and outputted from the CCD 16 and has passed through the CDS circuit 17 and the AFE 19, and an image processing circuit 23 that performs image processing.

A white spot or a white-spot pixel as a defective pixel does not have a normal photoelectric conversion function, and upon application of a transfer signal thereto, outputs a pixel signal (white signal) having a high signal level that is close to white.

The CCD drive portion 21 applies a generated CCD drive signal to the CCD 16 through the cable 25 inside the endoscope 2 to thereby cause pixels of a light receiving portion forming the CCD 16 to output signal charges obtained by photoelectric conversion as pixel signals.

Since the pixel signal includes a part of the signal (reset signal) of the CCD drive signal as noise, the CDS circuit 17 extracts a signal component within the pixel signal and outputs a pixel signal from which noise was removed. Note that the CDS circuit 17 generates a sampling signal for extracting a signal component from the CCD drive signal, and uses the sampling signal to generate the pixel signal from which noise was removed.

In a case of a configuration in which the CDS circuit 17 is provided at a position that is separated from the CCD 16, an output signal of the CCD 16 is liable to be affected by a signal delay caused by the cable that transmits the signal until the output signal is inputted to the CDS circuit 17. However, according to the present embodiment, because the CDS circuit 17 is arranged in the vicinity of the CCD 16, it is possible to extract a signal component of the CCD 16 with high precision because the output signal of the CCD 16 is not affected by a signal delay caused by the cable.

A baseband analog pixel signal from which noise was removed by the CDS circuit 17 is inputted to the AFE 19 through the cable 25 that forms a signal transmission path or a signal transmission line inside the insertion portion 6, the operation portion 7, and the cable portion 8. At the AFE 19, the pixel signal is amplified by an amplifier inside the AFE 19, and is thereafter converted from an analog pixel signal to a digital pixel signal by the A/D conversion circuit 19a as analog/digital conversion means or an analog/digital conversion portion.

Note that although a CCD drive waveform is blunted by the cable 25 within the endoscope 2 when transmitted to the distal end portion 14 of the insertion portion 6 since the CCD drive portion 21 is provided inside the processor 4, the waveform is corrected inside the SIP 18 and drives the CCD 16.

A digital pixel signal that is obtained after the pixel signal has passed through the A/D conversion circuit 19a in the AFE 19 is inputted to the white spot correction circuit 22 inside the image processing portion 24. The white spot correction circuit 22 performs image processing to correct a pixel that was determined to be a white spot, that is, a white-spot pixel.

A pixel signal for which correction for a white-spot pixel was performed by the white spot correction circuit 22 is converted to a standard video signal by the image processing circuit 23 and is then outputted to the monitor 5. An image of the object that was picked up by the CCD 16 is displayed as an endoscopic image on the screen of the monitor 5.

The endoscope 2 also includes a memory 27 as white spot positional information storage means or a white spot positional information storage portion that stores two-dimensional positional (abbreviated as simply "positional") information for white-spot pixels that were previously found in the CCD 16 mounted in the endoscope 2. For example, in the example shown in FIG. 1 the memory 27 is provided inside the signal connector 9a. Information regarding the number of horizontal and vertical pixels of the CCD 16 is also stored in the memory 27.

In a case where the signal connector 9a is connected to the processor 4, the memory 27 is electrically connected to the white spot correction circuit 22. The white spot correction circuit 22 reads out two-dimensional positional information with respect to the white-spot pixel from the memory 27 and, for example, stores the positional information as a white-spot pixel address in a memory 41 (see FIG. 3) provided in the white spot correction circuit 22. Accordingly, the memory 41 can also be regarded as constituting white spot positional information storage means that stores a two-dimensional position of a white-spot pixel that exists in the CCD 16.

As described later, by using white-spot pixel addresses that are stored in the memory 41, the white spot correction circuit 22 determines that a pixel is a white-spot pixel if the address of a pixel signal for the relevant pixel that is inputted to the white spot correction circuit 22 matches a white-spot pixel address, and determines that the relevant pixel is a normal pixel that is not a white-spot pixel if the address does not match a white-spot pixel address.

Since the timing of a pixel signal that is inputted to the white spot correction circuit 22 deviates (is delayed relative to the timing of the CCD drive signal) in accordance with the length of the cable 25 relative to the timing of the CCD drive signal, information regarding timing deviations that depend on the length of the cable 25 is also stored in the memory 27.

For example, at a timing at which the CCD drive signal drives a pixel P(i,j) that is an $i^{th}$ pixel in the horizontal direction and a $j^{th}$ pixel in the vertical direction of the CCD 16, because there is a delay amount that is caused by the length of the cable 25, in a case where a pixel signal that is actually inputted to the white spot correction circuit 22 through the AFE 19 is delayed by a time period corresponding to the number of pixels n (taking pixels arranged in the horizontal direction as units), information delayed by a time period corresponding to the number of pixels n is previously stored in the memory 27. That is, at a timing that the CCD drive signal drives the pixel P(i,j), since the delay amount is caused by the length of the cable 25, the timing at which a pixel signal of the pixel P(i,j) is actually inputted to the white spot correction circuit 22 is shifted to P(i+n,j).

In other words, the white spot correction circuit 22 is configured to be capable of ascertaining the timing at which a pixel signal is actually inputted to the white spot correction circuit 22 from each pixel as well as the two-dimensional position (address) of the pixel whose signal was actually inputted on the image pickup surface. Note that, as shown in FIG. 1, in a case where the white spot correction circuit 22 and the CCD drive portion 21 are arranged inside the processor 4, a delay amount until a CCD drive signal (transfer signal) outputted from the CCD drive portion 21 is applied to the CCD 16 and a delay amount until an output signal of the CCD 16 is inputted to the white spot correction circuit 22 can be approximated as being the same.

Figure 2:
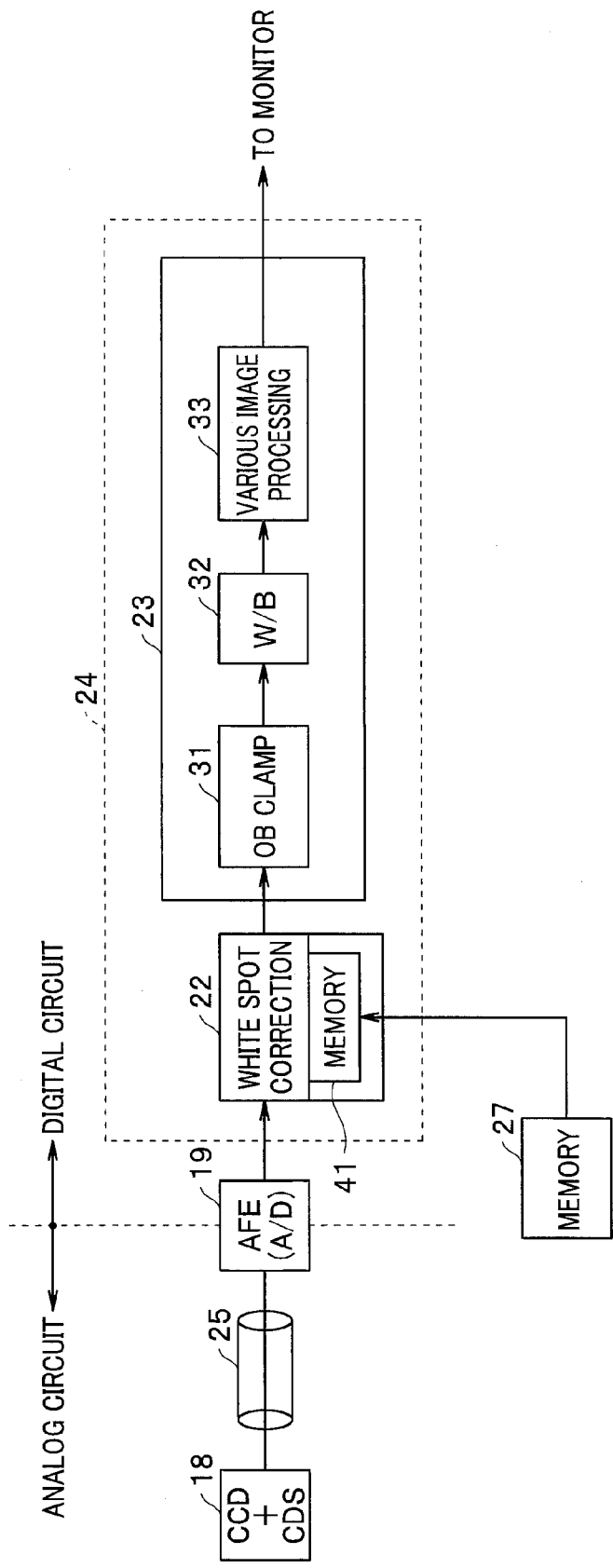
FIG. 2 is a block diagram illustrating the configuration of an image pickup system portion in FIG. 1.

FIG. 2 illustrates a schematic configuration of the image processing system shown in FIG. 1. As shown in FIG. 2, the SIP 18 that includes the CCD 16 is connected to the AFE 19 through the extremely thin cable (in practice, a coaxial cable) 25 inside the endoscope 2.

Consequently, when analog pixel signals outputted from the SIP 18 are transmitted by the cable 25, because of horizontal transfer efficiency degradation of the CCD itself, a low-pass filter for noise suppression, or the capacity (between an inner conductor and an outer conductor) increasing accompanying an increase in length in a case where the cable 25 is a coaxial cable such that the capacitive load increases and the like, the waveform of a pixel signal of a white-spot pixel is also blunted, and together with the pixel signal of the white-spot pixel, a pixel signal of a predetermined pixel outputted (read out upon application of the CCD drive signal) after the pixel signal of the white-spot pixel is affected thereby.

Accordingly, in the present embodiment, as described hereunder, for a pixel signal of a white-spot pixel, the white spot correction circuit 22 is configured to perform correction in a manner that excludes a pixel signal of a single pixel (referred to as "adjacent pixel") that is outputted as the next pixel signal after a pixel signal of the white-spot pixel with respect to peripheral pixels of the white-spot pixel.

In a pixel signal corrected by the white spot correction circuit 22, a signal level of an OB area is clamped by an OB clamp circuit 31 constituting the image processing circuit 23. Note that "OB" is an abbreviation of "optical black", and with respect to the OB area, a level of a pixel signal that is outputted from a shielded pixel when a pixel of the image pickup surface of the CCD 16 as an image pickup device is optically shielded is used as a black level of a pixel signal of a pixel that is not shielded. A pixel signal that is outputted from the OB clamp circuit 31 is inputted to a white balance circuit 33, and the white balance circuit 33 adjusts the white balance thereof. That is, the gain of an amplifier in the white balance circuit 33 is adjusted so that the levels of pixel signals of R, G, and B in a case where an image of a white object is picked up become a ratio of 1:1:1.

A pixel signal outputted from the white balance circuit 32 passes through a various image processing circuit 33 that performs various kinds of image processing such as enhancement of a horizontal contour and a vertical contour and gamma correction, and is thereby converted to a standard video signal and outputted to the monitor 5.

Figure 3:
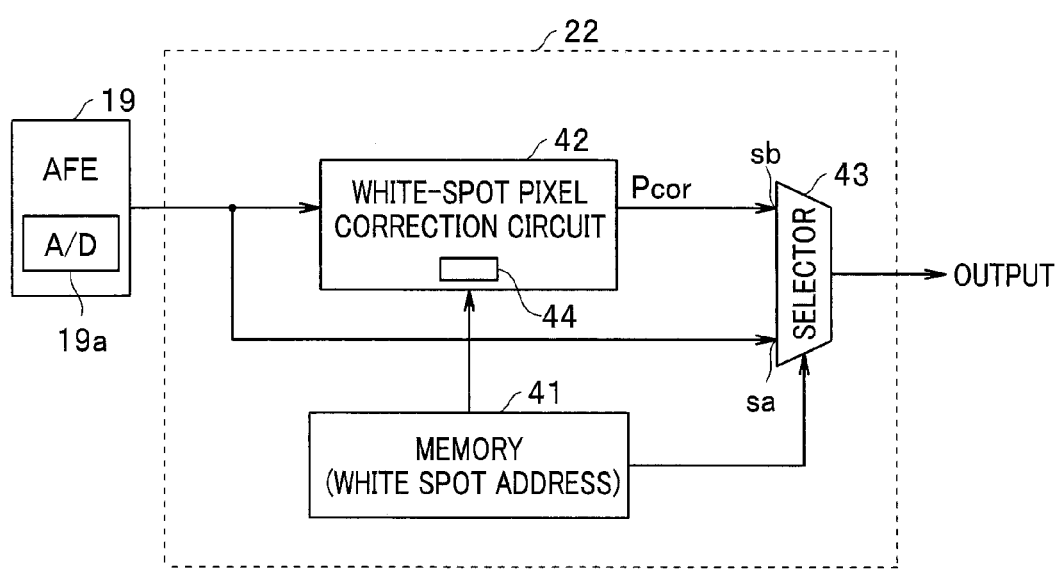
FIG. 3 is a block diagram illustrating the configuration of a white spot correction circuit.

FIG. 3 illustrates the configuration of the white spot correction circuit 22 shown in FIG. 1 and FIG. 2.

The memory 41 inside the white spot correction circuit 22 stores information including data for a white-spot pixel address as positional information of a white-spot pixel that is read out from the memory 27, and data of a delay amount (delay time period) by which an analog pixel signal that is outputted after passing through the CCD 16 and the CDS circuit 17 is delayed until being actually inputted into the white spot correction circuit 22 after being transmitted by the cable 25 and subjected to A/D conversion.

Note that a configuration may also be adopted in which the memory 41 is provided outside the white spot correction circuit 22. Further, a configuration may be adopted in which the memory 41 is not provided and the white spot correction circuit 22 is configured to read out required information from the memory 27.

A pixel signal that was picked up by the CCD 16 and subjected to CDS processing is transmitted by the cable 25 and converted to a digital pixel signal by the A/D conversion circuit 19a inside the AFE 19, and is thereafter inputted to a white-spot pixel correction circuit 42 inside the white spot correction circuit 22 and also inputted to one input terminal sa of a selector 43. The white-spot pixel correction circuit 42 outputs a pixel signal obtained after correcting a white-spot pixel to another input terminal sb of the selector 43. Further, a white spot address in the memory 41 is used for controlling switching (selecting) of the selector 43 so as to select one of the two pixel signals that were inputted to the two input terminals sa and sb of the selector 43 and output the selected pixel signal from the selector 43.

More specifically, in a case where a pixel signal from a white-spot pixel was inputted to the white spot correction circuit 22, a white spot address is used to control switching (selecting) of the selector 43 so as to select and output a pixel signal Pcor on which white spot correction was performed by the white-spot pixel correction circuit 42, and in a case where a pixel signal from a normal pixel Pn and not a white-spot pixel was inputted, the switching (selecting) of the selector 43 is controlled so as to select and output the normal pixel Pn.

Figure 4:
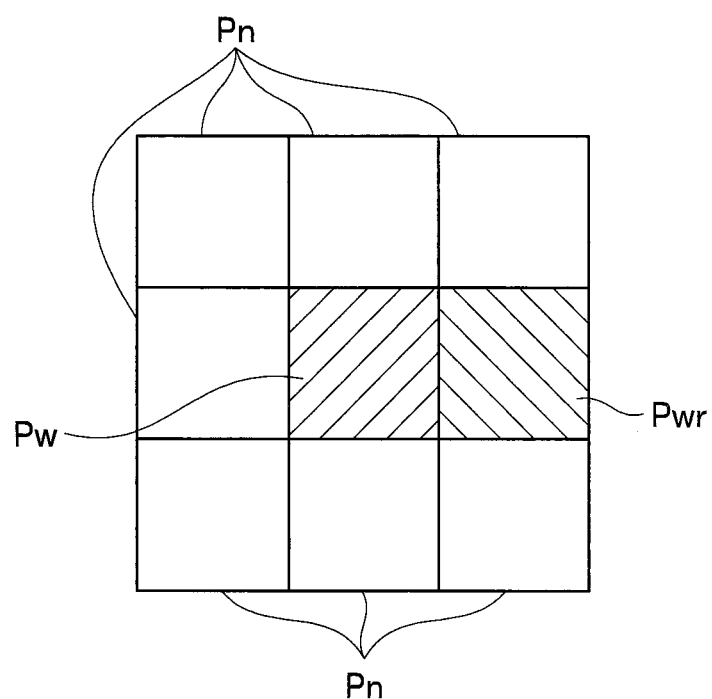
FIG. 4 is a view illustrating a white-spot pixel and peripheral pixels thereof.

FIG. 4 illustrates a white-spot pixel Pw in the CCD 16 and eight peripheral pixels thereof. These pixels are read out sequentially one line at a time from the left side to the right side along the horizontal direction as a predetermined direction. In the present embodiment, as described hereunder, the white-spot pixel correction circuit 42 provided in the white spot correction circuit 22 corrects a pixel signal of the white-spot pixel Pw using a white spot correction value Pav that is calculated based on pixel signals of seven peripheral pixels of the white spot excluding one pixel (in FIG. 4, an adjacent pixel on the right side of the white-spot pixel Pw) Pwr that is read out next after the white-spot pixel Pw.

The pixel signals of the normal pixels Pn inputted to the white spot correction circuit 22 are outputted via the selector 43 to the image processing circuit 23 of the following stage, and pixel signals of seven peripheral pixels of the white spot excluding the adjacent pixel (pixel from which a pixel signal is outputted next after the pixel signal of the white spot) Pwr that is next to the white-spot pixel Pw on the right side thereof among the eight peripheral pixels of the white spot that are inputted to the white-spot pixel correction circuit 42 are used for correcting the pixel signal of the white-spot pixel Pw. A seven peripheral pixels of white spot circuit 44 provided inside the white-spot pixel correction circuit 42 calculates an average value Pav of the pixel signals of the aforementioned seven peripheral pixels of the white spot as a white spot correction value that corrects the white-spot pixel Pw, and outputs the average value Pav to the selector 43 as the pixel signal Pcor that corrects the white-spot pixel Pw.

Note that the selector 43 selects (switches) one of two pixel signals Pn and Pcor that are inputted to the two input terminals sa and sb as described above, and outputs the selected pixel signal from one output terminal. That is, the selector 43 selects and outputs an image signal of the normal pixel Pn if a pixel signal of the normal pixel Pn is inputted, and if a pixel signal of the white-spot pixel Pw is inputted, the selector 43 outputs the average value Pav of pixel signals of the seven peripheral pixels of the white spot as the pixel signal Pcor that corrects the white-spot pixel Pw. Thus, the endoscope apparatus 1 including the image pickup apparatus of the present invention includes: the CCD 16 as an image pickup device having a plurality of pixels that are arranged in a two-dimensional manner for picking up an image of an object, and that outputs pixel signals that are picked up by the plurality of pixels; the memory 27 as a white spot positional information storage portion that stores (two-dimensional) positional information of a white-spot pixel as a defective pixel that exists in the image pickup device; the CCD drive portion 21 as an image pickup device drive portion that, by applying a transfer signal to the image pickup device, causes the pixel signals to be outputted along a predetermined direction from the plurality of pixels constituting the image pickup device; and the white spot correction circuit 22 as a white spot correction portion that, when it is determined based on positional information of the white-spot pixel that is read out from the white spot positional information storage portion that the pixel signal that is outputted from the image pickup device by application of the transfer signal is a pixel signal of a white-spot pixel, among pixel signals of eight peripheral pixels that surround a pixel that is determined to be the white-spot pixel that are outputted from the image pickup device, performs white spot correction with respect to a pixel signal of the pixel that is determined to be the white-spot pixel based on a white spot correction value that is calculated based on seven pixels excluding a pixel signal of an adjacent pixel that is outputted one pixel after the pixel that is determined to be the white-spot pixel.

The white spot correction circuit 22 according to the present embodiment performs the operations described above with reference to FIG. 3.

Therefore, according to the endoscope apparatus 1 of the present embodiment, even in a case where a waveform of an analog pixel signal is blunted by the cable 25, a pixel signal generated by a white-spot pixel as a defective pixel can be appropriately corrected.

Further, even when using the endoscope 2 in which the CCD 16 as the mounted image pickup device or the length of the cable 25 or the like is different, since positional information of a white-spot pixel Pw that exists in the mounted CCD 16 and the like is stored in the memory 27 as endoscope information storage means that is mounted in each endoscope 2, a pixel signal generated by a white-spot pixel can be appropriately corrected.

(OB area white spot correction) Note that, on the processor side (denoted by reference numeral 24 in FIG. 1), line clamping is performed at a digital circuit with respect to a horizontal OB area that includes around 30 pixels that is not illustrated in the drawings. In order to accurately carry out the line clamping, it is necessary to effectively perform noise removal including a white-spot pixel with respect to data of the horizontal OB area including a white-spot pixel that is the basis therefor. More specifically, it is possible to accurately perform line clamping by using a ranking filter to remove several pixels that have a maximum pixel value and several pixels that have a minimum pixel value among around 10 pixels at the center of one line, and perform the line clamping with the remaining OB pixels.

Second Embodiment

Next, a second embodiment of the present invention is described. In the first embodiment a configuration was adopted which mainly took into consideration the fact that a pixel signal of a white-spot pixel is blunted by the cable 25, and performed correction with respect to the pixel signal of a white-spot pixel in a case where the pixel signal was blunted.

When pixel signals have changed in a stepped shape as in the manner of pixel signals generated from white-spot pixels, in some cases ringing occurs in which a pixel signal transmitted by the cable 25 changes in a damping oscillatory manner that depends on the cable length of the cable 25 forming the signal transmission path and the like. The term "ringing" as used in the present specification refers to a phenomenon whereby, when a white-spot pixel generated a waveform having a convex part in an upward direction in a stepped shape, a waveform having a convex part in a downward direction, that is, a waveform in a valley shape, appears after the white-spot pixel as described hereunder, and as used herein the term "ringing" is different to ringing that respective oscillatory waveforms produce at a rising portion and a falling portion of a normal pulse.

When ringing produced by a white-spot pixel (referred to in abbreviated form as "white-spot pixel ringing") arises, the output level of a pixel signal of a predetermined pixel (that it is desired to correct) that is outputted at a position that is a predetermined number of pixels (for example, several pixels) after the white-spot pixel or a pixel signal of a pixel that is a correction target is caused to decrease (by the pixel signal of the white-spot pixel) in a valley shape from the original signal level value (pixel signal value) of the pixel signal of the relevant pixel, and consequently a phenomenon (abnormal pixel caused by a white-spot pixel) occurs whereby the relevant pixel is displayed or visually recognized as a black spot.

Figure 5:
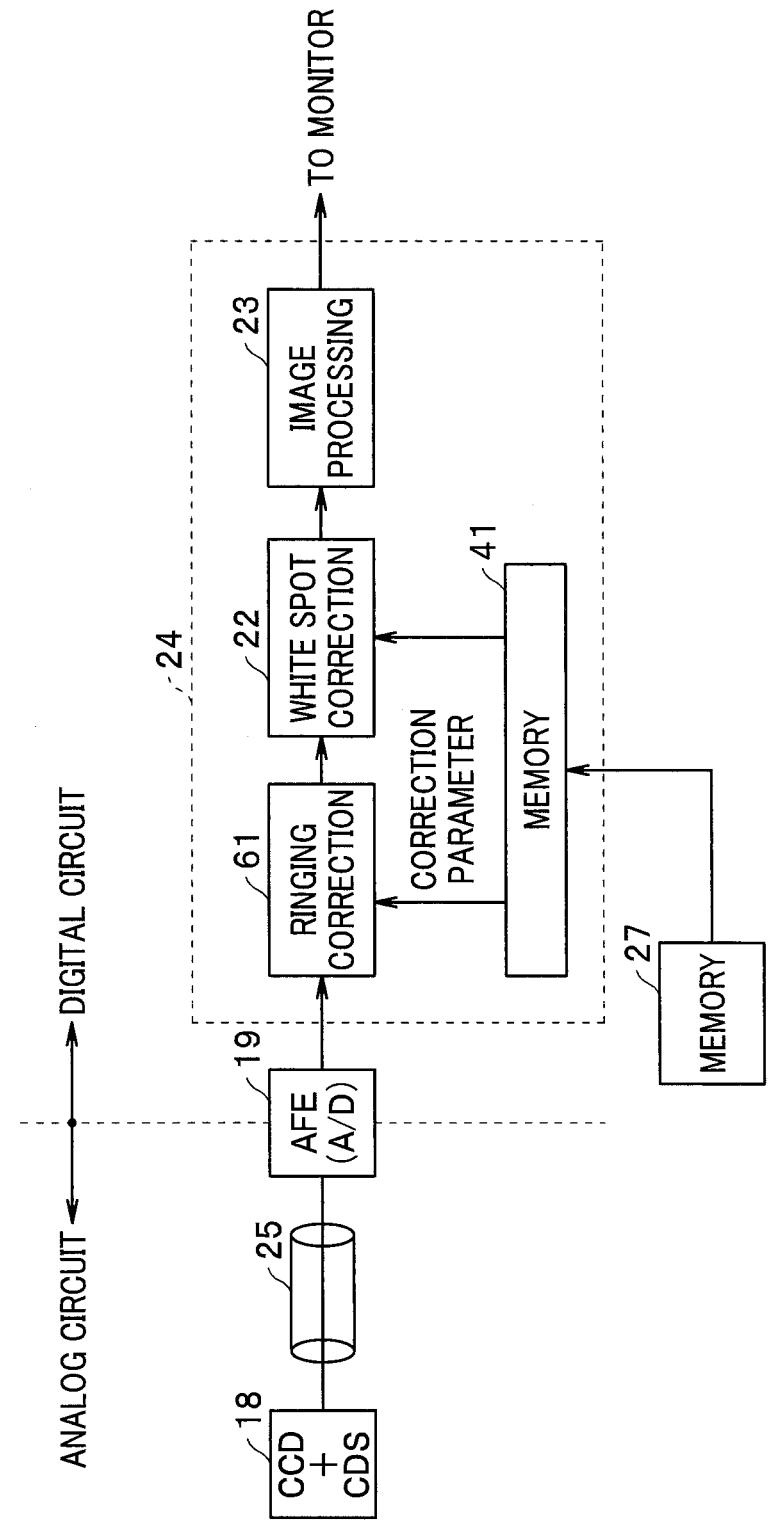
FIG. 5 is a block diagram illustrating the configuration of an image pickup system portion according to a second embodiment of the present invention.

Therefore, in the present embodiment, in addition to the configuration of the first embodiment, ringing correction means that corrects an abnormal pixel caused by white-spot pixel ringing, and additive correction means that corrects by adding a pixel value of an abnormal pixel that, in other words, decreases in a valley shape are provided. FIG. 5 illustrates the configuration of an image pickup system in an endoscope apparatus of the present embodiment.

The configuration shown in FIG. 5 is one in which, relative to the configuration shown in FIG. 2, a ringing correction circuit 61 is provided as additive correction means that corrects an abnormal pixel caused by ringing at a stage before the white spot correction circuit 22. The configuration and operations of the white spot correction circuit 22 are the same as the contents described in the first embodiment, and hence a description thereof is omitted here. Note that a configuration may also be adopted in which the ringing correction circuit 61 is included in the white spot correction circuit 22. That is, a configuration may be adopted in which the white spot correction means includes the ringing correction circuit 61 as ringing correction means that corrects an abnormal pixel that is caused by ringing.

(Ringing Correction)

According to the present embodiment, in addition to positional information of the white-spot pixel Pw and the like that is described above, information of a position (number of pixels position) of a pixel at which an abnormal pixel that is referred to as a "black spot" (counted) from a white-spot pixel Pw and information such as a signal value ratio (level ratio) or proportion that decreases as a pixel signal value (level) of an abnormal pixel with respect to a pixel signal value (level) of the white-spot pixel Pw are previously stored as correction parameters in the memory 27 provided in each endoscope 2.

For example, in a case where an $N^{th}$ pixel from the white-spot pixel Pw is an abnormal pixel or a pixel that is a correction target, information for N is previously stored in the memory 27.

Further, when a pixel signal value of the white-spot pixel Pw is taken as "Vw", in a case where a decreasing pixel signal value that decreases in a valley shape of the abnormal pixel Pa is Va, information of a correction coefficient k such that Va/(Vw−Va)=k is previously stored in the memory 27.

Note that in a case where a plurality of abnormal pixels Pa arise, when the abnormal pixel is taken as "Pai" and a decreasing pixel signal value that decreases in a valley shape is taken as "Vai", information for a correction coefficient ki such that Vai/(Vw−Vai)=ki is previously stored in the memory 27 that constitutes correction information storage means. Note that i=1, 2, 3, ..., m, where m represents a maximum number of the abnormal pixels Pa.

Further, a correction value obtained by multiplying (Vw−Vai)×ki is added to the pixel signal value Vai of the abnormal pixel Pai to correct the pixel signal value Vai of the abnormal pixel Pai (note that, if i in the abnormal pixel Pai is removed, the correction is for one abnormal pixel Pa).

Although the configuration example shown in FIG. 5 illustrates an example in which the memory 41 is provided outside the white spot correction circuit 22, a configuration may also be adopted in which the memory 41 is provided inside the white spot correction circuit 22 as in the above described configuration example. The memory 41 reads information from the memory 27 and stores the information inside the memory 41. When performing ringing correction, the ringing correction circuit 61 acquires correction parameters and the like necessary for the correction from the memory 41. Note that a configuration may also be adopted in which the memory 41 is not provided, and information required for correction and the like is acquired from the memory 27.

Figure 6:
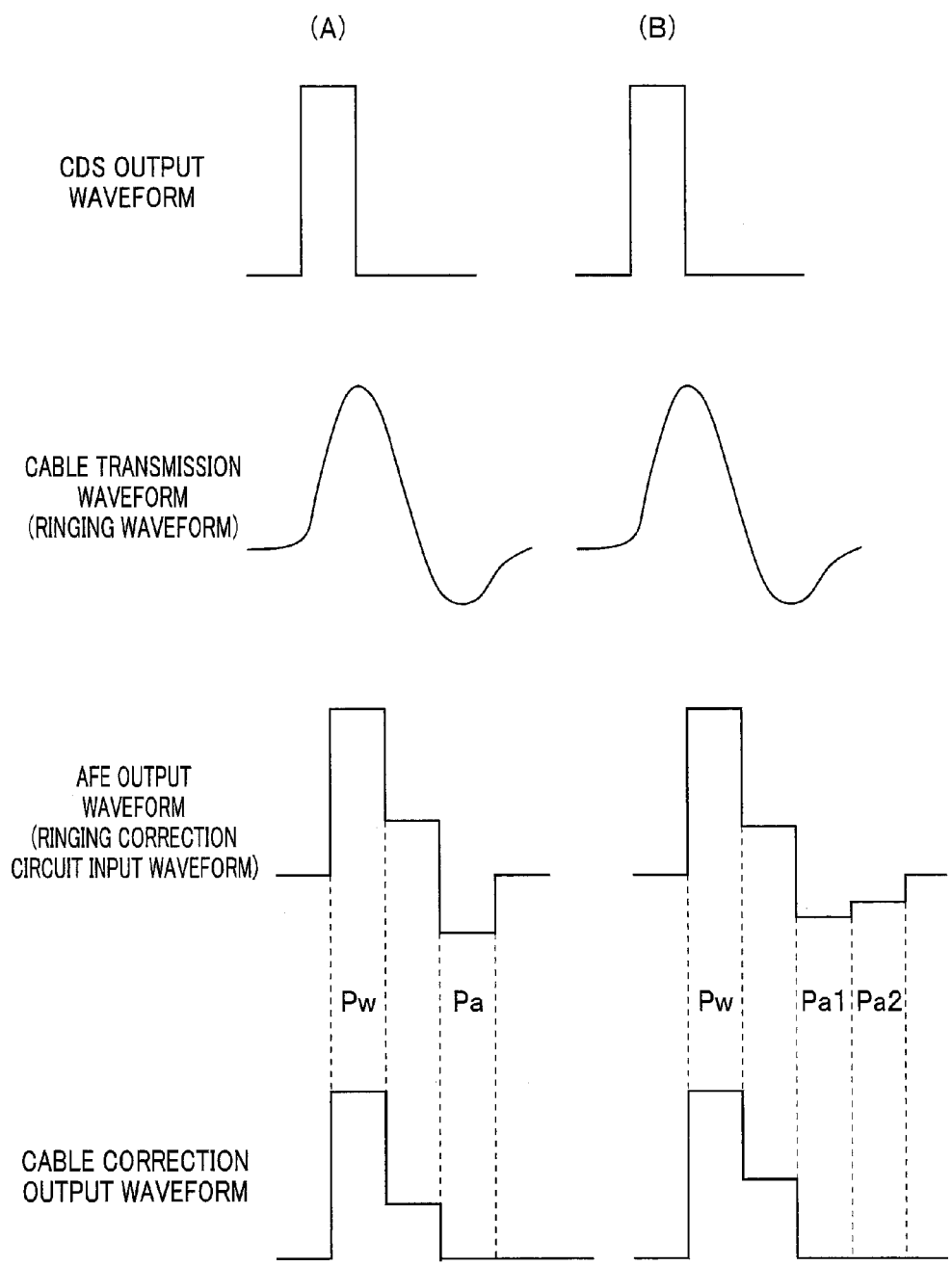
FIG. 6 is an explanatory view for performing ringing correction according to the second embodiment.

FIG. 6 illustrates schematic examples of waveforms generated by a pixel signal of the white-spot pixel Pw and an abnormal pixel Pa or Pai caused by a pixel signal of the white-spot pixel Pw. Note that (A) and (B) in FIG. 6, for example, illustrate cases in which the respective cable lengths are different. Apart from the cable length, the kind of cable and the end portion of the cable and the like also influence the occurrence of ringing.

The pixel signal of the white-spot pixel Pw that arises in the CCD 16 is outputted in a pulse shape through the CDS circuit 17. CDS output waveforms are illustrated in FIG. 6. Note that the horizontal axis in FIG. 6 represents time, and the longitudinal axis represents a pixel signal value (level). However, in the AFE output waveforms, the horizontal axis represents, in pixel units, the positions of following pixels based on the pixel position of the white-spot pixel Pw.

Although the output signal of the CDS circuit 17 that is described above is transmitted by the cable 25, with respect to the pixel signal of the white-spot pixel Pw, due to the occurrence of ringing, the pixel signal thereof changes shape from a stepped pulse waveform to a waveform with a (blunted) convex portion in a mountain shape as illustrated by the waveform after cable transmission in FIG. 6, and furthermore, a waveform on a pixel portion side that is outputted after the white-spot pixel Pw changes shape to form a concave portion in a valley shape. That is, the pixel signal value of a pixel that follows the white-spot pixel Pw decreases in a valley shape due to the influence of the white-spot pixel Pw.

A pixel signal with this kind of waveform is subjected to A/D conversion at the AFE 19 and converted to a digital pixel signal, and becomes a step-like waveform as illustrated by the post-AFE waveform in FIG. 6. The pixel signal with the post-AFE waveform passes through a short cable inside the processor 4 and is inputted to the ringing correction circuit 61 as the additive correction means that corrects ringing caused by a white spot. That is, the AFE output waveform essentially becomes an input waveform to the ringing correction circuit 61. Note that a time delay caused by the short cable inside the processor 4 can normally be ignored.

In the post-AFE waveform of FIG. 6(A), an abnormal pixel Pa that forms a concave portion in a valley shape arises at the second pixel after the white-spot pixel Pw.

On the other hand, in the post-AFE waveform of FIG. 6(B), two abnormal pixels Pa1 and Pa2 that form concave portions in a valley shape arise at a second pixel and a third pixel after the white-spot pixel Pw.

(Ringing Correction)

In order to correct such abnormal pixels Pa (Pa1, Pa2 and the like), in the present embodiment the ringing correction circuit 61 constituting the additive correction means performs correction for an abnormal pixel Pai (note that, although parallel notation of Pa is omitted, it is assumed that Pai also includes the case of Pa) with respect to inputted digital pixel signals. A pixel signal that underwent correction by the ringing correction circuit 61 is inputted to the white spot correction circuit 22, and is subjected to correction for the white-spot pixel Pw as described above, and outputted to the image processing circuit 23.

Figure 7:
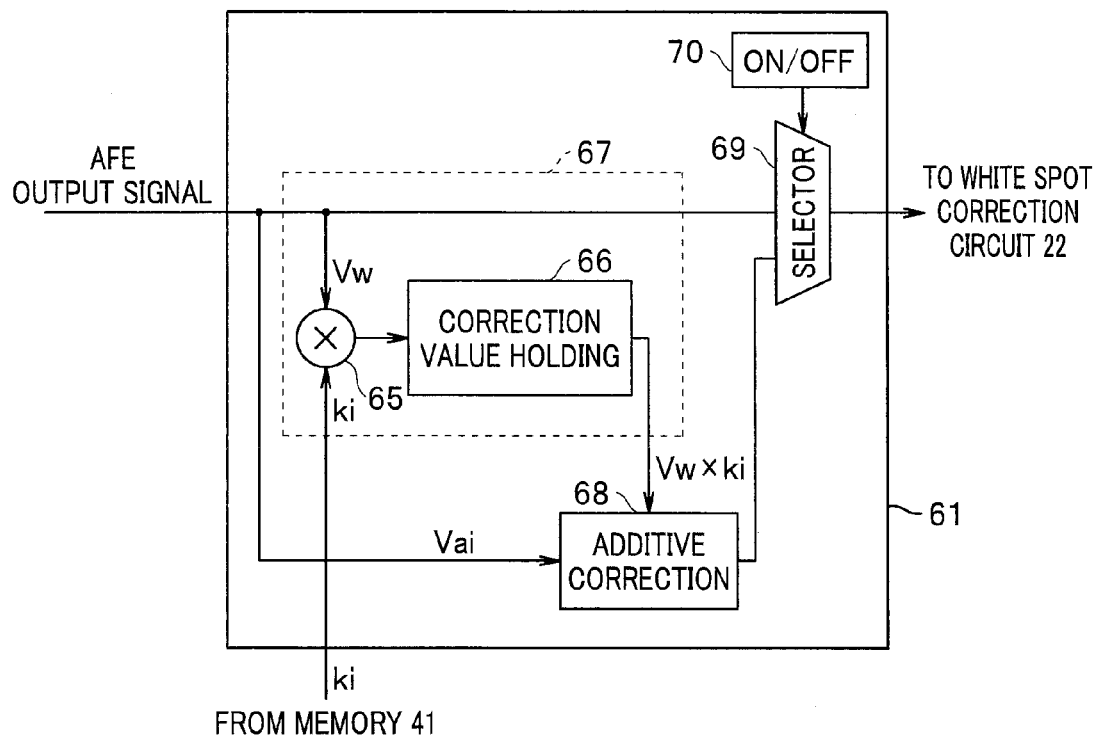
FIG. 7 is a block diagram illustrating the configuration of a ringing correction circuit.

FIG. 7 illustrates a detailed configuration of the ringing correction circuit 61 as the additive correction means. The ringing correction circuit 61 includes a multiplication circuit 65 that, based on an inputted pixel signal and using positional information of the white-spot pixel Pw in the memory 41, multiplies a pixel signal value Vw of the white-spot pixel Pw and a correction coefficient ki at a timing at which the pixel signal value Vw of the white-spot pixel Pw is inputted, and a correction value holding circuit 66 that holds (stores) a correction value Vw×ki obtained by the multiplication. A correction value calculation and holding circuit 67 that calculates and holds a correction value that corrects the pixel signal value Vai of the abnormal pixel Pai by means of the pixel signal value Vw of the white-spot pixel Pw is constituted by the multiplication circuit 65 and the correction value holding circuit 66.

(Ringing Correction)

Further, the ringing correction circuit 61 has an additive correction circuit 68 that performs correction with respect to an abnormal pixel Pai that is inputted after the white-spot pixel Pw, that adds a pixel signal value Vai of the abnormal pixel Pai and the correction value held by the correction value holding circuit 66, and outputs the corrected value to the white spot correction circuit 22 through a selector 69. Note that, by means of a switch 70 used for turning the ringing correction on or off, the selector 69 selects the pixel signal value Vw of the white-spot pixel Pw when ringing correction is turned off, and when ringing correction is turned on, selects the pixel signal to which a correction value was added by the additive correction circuit 68 and outputs the pixel signal to the white spot correction circuit 22.

Operations of the ringing correction circuit 61 of the present embodiment according to this configuration will now be described.

As described above, a pixel signal having an AFE output waveform as described using FIG. 6 is inputted to the ringing correction circuit 61.

As shown in the lowermost section of FIG. 6, at a timing at which the white-spot pixel Pw is inputted, the multiplication circuit 65 inside the ringing correction circuit 61 multiplies the pixel signal value Vw thereof by the correction coefficient ki to calculate the correction value Vw×ki, and the correction value holding circuit 66 holds the correction value Vw×ki.

(Ringing Correction)

Note that the pixel signal of the white-spot pixel Pw is inputted to the white spot correction circuit 22 through the ringing correction circuit 61.

Further, when a pixel signal value Va of the abnormal pixel Pa that is inputted after the white-spot pixel Pw as shown in FIG. 6(A) is inputted, the additive correction circuit 68 as additive correction means adds the correction value Vw×ki that is held by the correction value holding circuit 66 to the pixel signal value Va and outputs the resulting value. That is, when the pixel signal value Va of the abnormal pixel Pa is inputted, the additive correction circuit 68 corrects the pixel signal value Va to a corrected pixel signal value Va+Vw×ki, and outputs the corrected pixel signal value Va+Vw×ki to the white spot correction circuit 22.

Further, in a case where a plurality of abnormal pixels Pa1 and Pa2 arise as illustrated in FIG. 6(B), correction that is similar to the above described correction is performed using correction coefficients k1 and k2 for the respective abnormal pixels Pa1 and Pa2.

Although it has been described above that the average value Pav of pixel signals of the aforementioned seven peripheral pixels of a white spot that exclude the pixel signal of an adjacent pixel (horizontally adjacent pixel) that is outputted as the pixel signal of the next pixel after a single white-spot pixel is calculated as a white spot correction value, since the pixel signals have a relationship in the horizontal direction because of the principles of the transfer system in the CCD, a configuration may also be adopted so as to also take into consideration the influence of a white-spot pixel with respect to one pixel whose pixel signal is outputted at a timing corresponding to one pixel before the pixel signal of the white-spot pixel.

For example, a configuration may be mentioned that calculates an average value of pixel signals of six peripheral pixels of a white spot that exclude two adjacent pixel that are adjacent to (before and after) the white-spot pixel in the horizontal direction. In addition, a configuration may be mentioned in which correction coefficients are prepared for two adjacent pixels, and the two adjacent pixels are corrected using the respective correction coefficients.

(Ringing Correction)

Thus, a pixel signal for which the pixel signal value Vai of abnormal pixels Pa and Pai (i=1, 2) as illustrated in the lowermost section of FIG. 6 was corrected is outputted from the ringing correction circuit 61 to the white spot correction circuit 22 side, and the white spot correction circuit 22 performs correction with respect to the white-spot pixel Pw in the manner described above.

According to the present embodiment that has the above described configuration and performs the above described operations, a pixel signal that is attributable to a white-spot pixel as a defective pixel can be appropriately corrected even when the waveform of an analog pixel signal is blunted by a cable as in the first embodiment, and furthermore, even when an abnormal pixel Pa whose pixel signal value is caused to decrease in a valley shape as the result of ringing caused by a white spot arises at the periphery of the white-spot pixel, the pixel signal value of the abnormal pixel Pa can be corrected to an appropriate pixel signal value. Thus, according to the present embodiment, even when a phenomenon occurs whereby the image quality deteriorates in a black spot shape due to ringing, the deterioration in the image quality can be reduced or eliminated.

Note that, although in above described second embodiment a configuration is described in which white spot correction is performed by the white spot correction circuit 22 after ringing correction is performed by the ringing correction circuit 61, a configuration may also be adopted in which ringing correction is performed by the ringing correction circuit 61 after white spot correction is performed by the white spot correction circuit 22.

In such case, a configuration is adopted so that, when white spot correction was also performed by the white spot correction circuit 22, the pixel signal value Vw of the white-spot pixel Pw before performing white spot correction is held, and ringing correction is performed by the ringing correction circuit 61 using the pixel signal value Vw.

In a case where the white-spot pixels Pw rarely arise with respect to the normal pixels Pn, the operations and effects are almost the same between a case where ringing correction is performed before the white spot correction circuit 22 and a case where ringing correction is performed after the white spot correction circuit 22.

(Circuit Configuration for White Spot Correction and Ringing Correction)

Figure 8:
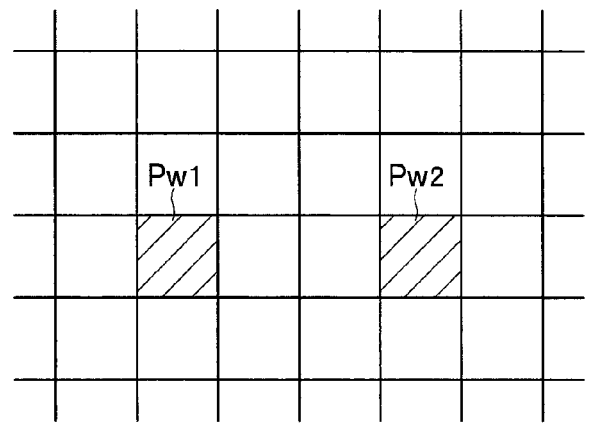
FIG. 8 is a view illustrating pixels in a case where a plurality of white-spot pixels exist close to each other in an image pickup device.

However, as described hereunder, a case may occur where white-spot pixels Pw arise adjacent (near) to each other. Taking such a case into consideration, performing white spot correction after performing ringing correction as described below is a processing method that is not complicated and which allows correction to be performed simply FIG. 8 illustrates a portion of the CCD 16 at which a plurality of white-spot pixels Pw1 and Pw2 exist near each other. In a case where a plurality of white-spot pixels Pw1 and Pw2 exist near each other in the horizontal direction as shown in FIG. 8; since the state is such that the influence of ringing and the influence of blunting that is caused by the cable 25 are mixed, for example, if white spot correction by the white spot correction circuit 22 is performed first, a pixel signal value of the white-spot pixel Pw that will be required when correcting the influence produced by ringing will have already been corrected, and consequently the processing method for correcting the influence thereof will be complicated and it will become difficult to perform the correction in a simple manner.

In contrast, if the influence caused by ringing is eliminated (reduced) by the ringing correction circuit 61 first as described above, the remaining influence will be attributable to the white-spot pixel Pw and the blunting caused by cable transmission. Therefore, with respect to the remaining influence attributable to the white-spot pixel Pw and the blunting caused by cable transmission, it is sufficient to perform the correction described in the first embodiment to remove the influence, and thus correction can be performed simply and without requiring complicated processing.

Ringing Correction

Third Embodiment

Figure 9:
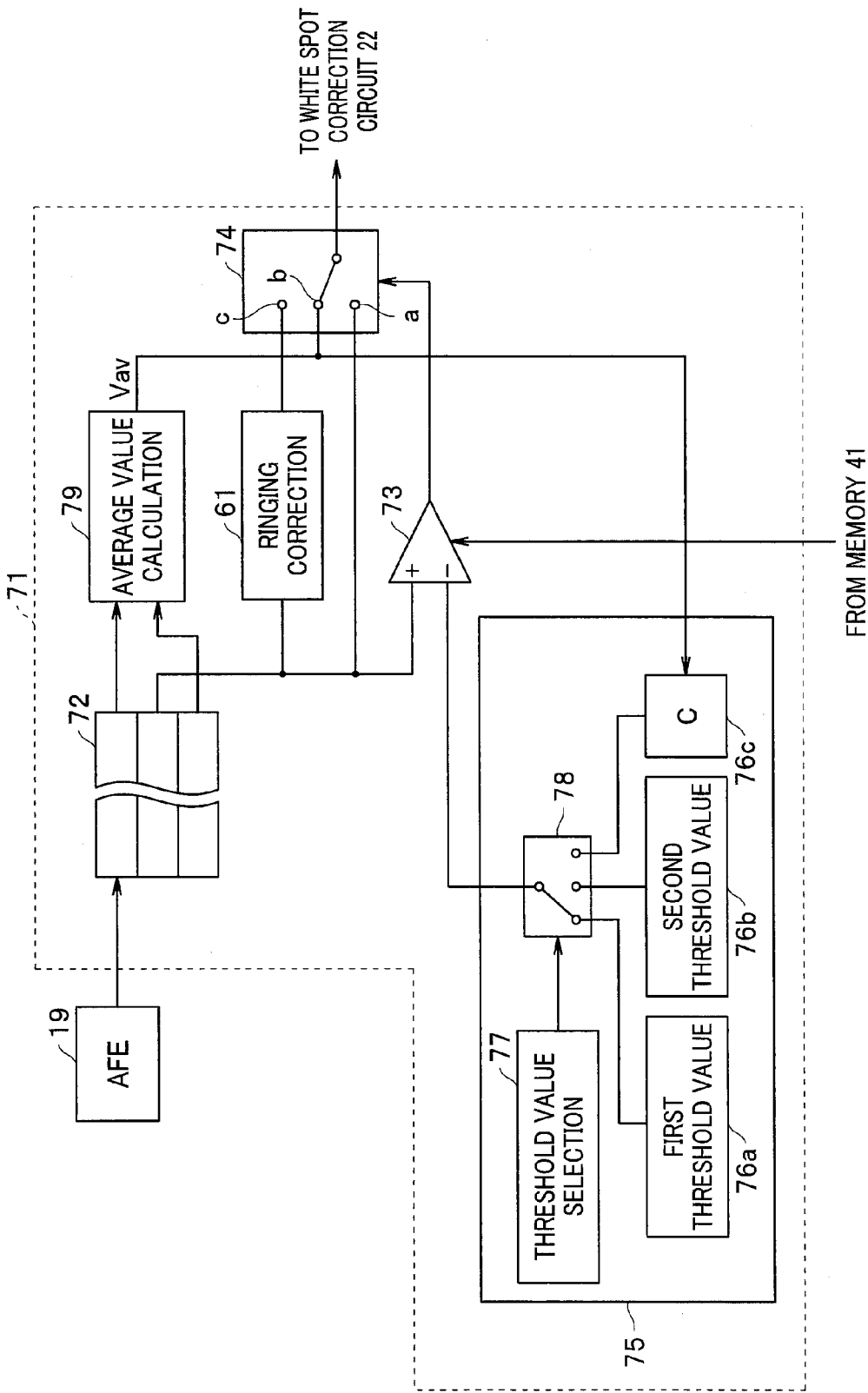
FIG. 9 is a block diagram illustrating the configuration of an adjacent pixel correction portion according to a third embodiment of the present invention.

FIG. 9 illustrates the configuration of an adjacent pixel correction circuit 71 according to a third embodiment. The present embodiment has a configuration that, relative to the configuration of the second embodiment, for example, further includes the adjacent pixel correction circuit 71 as adjacent pixel correction means that performs correction with respect to an adjacent pixel Pwr that is adjacent to the white-spot pixel Pw.

A pixel signal outputted from the AFE 19 is inputted into, for example, a three-line memory 72 constituting the adjacent pixel correction circuit 71, and pixel signals for three horizontal lines that are configured to hold a relationship in which three pixels are adjacent in the vertical direction are sequentially stored. A pixel signal that is read out from an output terminal of a center line is inputted to a comparator 73 forming determination means, and is also outputted to one input terminal a of a switching circuit 74 and an input terminal c through a ringing correction circuit 61.

The comparator 73 compares the aforementioned image signal and a threshold value that is set by a threshold value setting circuit 75, and controls signal switching of the switching circuit 74 based on the comparison result. In other words, the comparator 73 forms determination means that uses the threshold value to determine whether or not the aforementioned image signal is within a range of values that should be corrected.

In the present embodiment, the threshold value setting circuit 75 is configured to be capable of selecting a threshold value to be actually used from a plurality of threshold values in accordance with the usage situation, and using the selected threshold value. The threshold value setting circuit 75 has, for example, a first threshold value generation circuit 76a, a second threshold value generation circuit 76b, and a third threshold value generation circuit 76c that generate a first threshold value, a second threshold value, and a third threshold value, respectively, as the plurality of threshold values, and is configured so that the threshold value to be connected to the comparator 73 through a selection switch 78 can be selected by a threshold value selection portion 77.

For example, the first threshold value is set to a threshold value that determines a level of a dark current (or a black level), the second threshold value is set to a threshold value that determines a level that is close to 0 that is lower than the level of a dark current, and the third threshold value is set to a threshold value that determines whether or not a value decreases by a predetermined proportion or more from an average value that is described hereunder.

The first threshold value or the second threshold value determines whether or not the pixel signal of the adjacent pixel Pwr is decreased by ringing to a dark current level or the vicinity of a lower limit of a conversion range of the A/D conversion circuit 19a.

On the other hand, the third threshold value is a value for determining a case of a usage environment where blunting of a waveform due to a capacitive load when a signal of the white-spot pixel Pw is transmitted by the cable 25 is greater than the influence of ringing, and such blunting affects the adjacent pixel Pwr.

The comparator 73 compares a signal value of the image signal of the adjacent pixel Pwr with the third threshold value that is obtained by multiplying an average value Vav of the influence on vertically adjacent pixels (which are not affected by an influence with respect to cable transmission produced by the white spot pixel Pw) that are adjacent in the vertical direction (up-and-down direction) to the adjacent pixel Pwr by a predetermined coefficient C, to thereby determine whether or not the signal value is affected by an influence with respect to cable transmission produced by the white-spot pixel Pw.

(Ringing correction) The comparator 73, for example, is controlled so as to perform a comparison operation based on positional information of the white-spot pixel Pw stored in the aforementioned memory 27 or memory 41 and information that is subjected to a time delay in the cable 25, at a timing at which the adjacent pixel Pwr, the pixel signal of which is outputted at a timing corresponding to one pixel after the white-spot pixel Pw is actually inputted to the comparator 73. A configuration may also be adopted in which a circuit that controls the comparator 73 so as to perform this comparison operation is provided.

Further, the adjacent pixel correction circuit 71 has an average value calculation circuit 79 that calculates an average value between a pixel signal of one line before the aforementioned center line and a pixel signal of one line after the center line from the three-line memory 72. The average value calculation circuit 79 calculates an average value Vav of pixel signals of two adjacent pixels in the vertical direction that are located on one line before and one line after the adjacent pixel Pwr, and outputs the average value Vav to another input terminal b of the switching circuit 74 and also outputs the average value Vav to the third threshold value generation circuit 76c.

The third threshold value generation circuit 76c multiplies the average value Vav by a coefficient C (for example, C=0.7 to 0.8 approximately) of a predetermined proportion to generate the third threshold value.

In a case where the signal value of the pixel signal of the aforementioned adjacent pixel Pwr serves as determination information with respect a comparison result to the effect that the signal value is less than or equal to the threshold value, the comparator 73 switches so as to select the input terminal b, and an image signal of the average value Vav of the average value calculation circuit 79 is outputted instead of the image signal of the adjacent pixel Pwr to the white spot correction circuit 22 through the switching circuit 74. Note that a configuration may also be adopted that switches so as to select the input terminal c instead of the input terminal b according to the threshold value that is connected to the comparator 73.

On the other hand, in the case of a comparison result to the effect that the signal value of the pixel signal of the adjacent pixel Pwr exceeds the threshold value, the comparator 73 switches so as to select the input terminal a, and the pixel signal of the adjacent pixel Pwr is outputted to the white spot correction circuit 22 through the switching circuit 74.

According to the present embodiment that has the above described configuration and performs the above described operations, in addition to the operations and effects of the second embodiment, in a case where the signal value of the adjacent pixel Pwr is a value that deviates from the original signal value thereof due to ringing caused by the white-spot pixel Pw or blunting caused by cable transmission, because correction is performed that replaces the signal value with an average value of adjacent pixels that are adjacent thereto in the vertical direction, correction can be performed that obtains favorable image quality.

Note that the present invention is not limited to a case of using a threshold value to determine whether or not an influence caused by ringing is equal to or less than a lower limit side of a conversion range of the A/D conversion circuit 19a, and a configuration may be adopted so as to perform correction with respect to the adjacent pixel Pwr by setting a threshold value on an upper limit side also and determining whether or not the influence caused by ringing is greater than or equal to the threshold value.

An embodiment that is configured by partially combining the above described embodiments or the like also belongs to the present invention. In addition, although an example in which the AFE 19 is provided inside the signal connector 9a is shown in FIG. 1, the AFE 19 may be disposed at another position, for example, inside the operation portion 7 of the endoscope 2. Further, the AFE 19 or the A/D conversion circuit 19a may be disposed inside the processor 4.

A problem also exists that is limited to a case where an image signal is comparatively high. Although it need hardly be mentioned that an image signal is obtained by the CCD 16, a maximum value of an image signal may differ for each pixel of the CCD 16.

This is a phenomenon that is generally referred to as a "saturation zara". There is no problem if the saturation zara has a form that cannot be seen on the monitor 5. For example, in a case where a maximum value of the image signal of the CCD 16 can be adequately obtained, it is considered that the dynamic range is wide and it is sufficient to adopt a configuration so as to display the image signal on the monitor 5 in a range such that a saturation zara does not appear. Normally, a limit is applied at an image signal level at which a saturation zara does not appear using means referred to as "saturation clipping". An image signal that is equal to or greater than the threshold value of the saturation clipping is replaced with the threshold value of the saturation clipping.

A problem does not arise if an image signal that is equal to or greater than the threshold value of the saturation clipping can be obtained for all pixels of the CCD 16.

Note that when determining whether or not a maximum value of an image signal is sufficient, it should be considered that image signals of the CCD 16 are in a linear range. If the range is linear, an image signal that is proportional to the received light amount is obtained, and thus an appropriate image can be created.

With regard to the saturation zara phenomenon, when attention is focused on levels that are higher than a maximum value of an image signal in a linear range, it is generally considered that a signal with respect to a light amount for each pixel is obtained in a non-linear shape and consequently the saturation zara occurs.

Consequently, when a value of an image signal is less than a threshold value of saturation clipping at several pixels due to a fact that the maximum value of the image signal of the CCD 16 is not sufficient, the saturation zara appears on the monitor 5.

Furthermore, at such time, in some cases the saturation zara is made conspicuous as a result of the influence of gain adjustment (including white balance adjustment) or gamma correction in image processing that is performed prior to displaying the image signal on the monitor 5.

Note that since this phenomenon strongly depends on the performance of the CCD 16, it is desirable to implement a countermeasure according to the characteristics of the CCD 16. The phenomenon depends not on individual differences of respective CCDs 16, but on the kind of the CCD 16 (differences in the number of pixels or differences in the operating frequency). Further, the phenomenon may change according to the kind of the CCD 16, and some CCDs 16 have a characteristic such that saturation zara appear consecutively in the longitudinal direction, while other CCDs 16 do not have such a characteristic.

Figure 10:
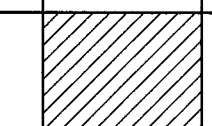
FIG. 10 is an explanatory view for illustrating a saturation zara interpolation method according to a third embodiment of the present invention.

With respect to this problem, it is favorable to store positions of pixels that cause a saturation zara (referred to simply as "unsaturated pixels") on the CCD 16 in the memory 27, and to perform interpolation (correction) based on the positional information. A method that applies an average value using peripheral pixels as described in the foregoing may be applied as the interpolation (correction) method. The method will now be described referring to FIG. 10. FIG. 10 illustrates an unsaturated pixel (indicated by diagonal lines) that is an interpolation (correction) target, and eight peripheral pixels (A to H) that are adjacent to the unsaturated pixel. Note that, in the following description, a pixel value of a pixel I (I=A to H) is indicated simply by "I".

As one method for simply interpolating an unsaturated pixel, an average value that is simply calculated by using all the peripheral pixels of the unsaturated pixel can be adopted, and in this case is determined by the calculation (A+B+C+D+E+F+G+H)÷8. Further, in a case where unsaturated pixels exist consecutively in the vertical direction, an average value is calculated as described below.

In this case, the average value is determined by the calculation (A+C+2D+2E+F+H)÷8. By using the pixels D and E in place of the pixels B and G, the average value does not become too small and interpolation can be performed at a sufficiently high signal level. Similarly, if there is a pixel that is unsuitable for determining an average value among the peripheral pixels, it is possible to perform interpolation appropriately by replacing the unsuitable pixel with a suitable pixel.

The interpolation mainly depends on the characteristic of an unsaturated pixel that arises depending on the CCD 16. Therefore, it is sufficient to change the method of calculating an average value according to the kind of CCD 16.

Although the aforementioned positional information is used in an interpolation method for an unsaturated pixel, it is desirable to perform interpolation effectively since the storage capacity is limited. More specifically, it is desirable to combine interpolation that uses positional information and interpolation that does not use positional information.

First, to prepare image positions, in a case where an image signal exceeds a threshold value for interpolation (for example, 90 IRE) and is less than a threshold value (96 IRE) for determining a high luminance with respect to a target pixel, the positional information is stored in the memory 27. Note that one IRE corresponds to a level of 7.14 mV.

More specifically, it is desirable to perform tests at the time of manufacturing and shipping the CCD 16 for the above described purpose. The reason for this is it is necessary to accurately measure image signals and apply appropriate light to the CCD 16.

At a position of a pixel that is based on the positional information, if the image signal exceeds the threshold value for interpolation, interpolation is executed and the saturation zara is improved. As a result, an image signal that should saturate can be changed as being sufficiently saturated. When an image signal is less than the threshold value for interpolation, since the image signal need not saturate, interpolation is not performed.

Next, at the position of a pixel that is not based on the positional information, when a threshold value for determining a high luminance is exceeded with respect to a target pixel, determination is further performed using a threshold value (98 IRE) for determining unsaturation. In this determination, interpolation is not performed if the determined value is between 98 and 100 IRE, while if the value is between 96 and 98 IRE, interpolation is performed.

The reason interpolation is not performed when a determined value is between 98 and 100 IRE, is that the saturation zara is not conspicuous since the image signal is almost saturated. It is thereby possible to effectively perform interpolation only when necessary.

Note that in a case where positions of white-spot pixels and positions of unsaturated pixels are stored in the memory 27, it is sufficient to provide a flag indicating which kind of pixel the relevant pixel is in an MSB (most significant bit of 16 bit data) or to divide the storage region.

Further, although in the foregoing description a method using positional information of pixels and a method that does not use positional information of pixels are combined, if an endoscope is used in which there is no positional information of pixels, interpolation can be performed by the above described method that does not use positional information of pixels.

For example, an interpolation method may be mentioned that replaces the relevant value with an average value of the peripheral eight pixels when the relevant value is less than the threshold value for high luminance determination.

What is claimed is:

1. An image pickup apparatus, comprising:
   an image pickup device having a plurality of pixels that are arranged in a two-dimensional manner for picking up an image of an object, and which outputs pixel signals that are picked up by the plurality of pixels;
   a white spot positional information storage portion that stores positional information of a white-spot pixel as a defective pixel that exists in the image pickup device;
   an image pickup device drive portion that, by applying a transfer signal to the image pickup device, causes the pixel signals to be outputted along a predetermined direction from the plurality of pixels comprising the image pickup device;
   a white spot correction portion that, when it is determined based on positional information of the white-spot pixel that is read out from the white spot positional information storage portion that the pixel signal that is outputted from the image pickup device by application of the transfer signal is a pixel signal of a white-spot pixel, among pixel signals of eight peripheral pixels that surround a pixel that is determined to be the white-spot pixel that are outputted from the image pickup device, performs white spot correction with respect to a pixel signal of the pixel that is determined to be the white-spot pixel based on a white spot correction value that is calculated based on seven pixels excluding a pixel signal of an adjacent pixel that is outputted one pixel after the pixel that is determined to be the white-spot pixel;
   a cable that transmits an analog pixel signal of each pixel comprising the image pickup device;
   an analog/digital conversion portion that converts the analog pixel signal that is transmitted by the cable to a digital pixel signal and outputs the digital pixel signal to the white spot correction portion; and
   an additive correction portion that performs correction that adds a predetermined proportion of a pixel signal value of the pixel that is determined to be the white-spot pixel to a pixel signal of a predetermined pixel that is outputted a predetermined number of pixels after the pixel that is determined to be the white-spot pixel, with the predetermined number of pixels being greater than or equal to one pixel.

2. The image pickup apparatus according to claim 1, wherein the white spot correction portion comprises:
   a white spot correction circuit that calculates an average value of pixel signals of the seven pixels as the white spot correction value for the pixel that is determined to be the white-spot pixel; and
   a selector that, by means of a switching signal that is based on positional information of the white-spot pixel of the white spot positional information storage portion, in a case where a normal pixel that is not determined to be the white-spot pixel is inputted, selects and outputs a pixel signal of the normal pixel, and in a case where a pixel signal of the pixel that is determined to be the white-spot pixel is inputted, selects and outputs a pixel signal of the white spot correction value that is calculated by the white spot correction circuit.

3. The image pickup apparatus according to claim 2, comprising:
   a correction information storage portion that previously stores correction information of a position of the predetermined pixel that is outputted the predetermined number of pixels after the pixel that is determined to be the white-spot pixel and the predetermined proportion;
   wherein, at a timing at which a pixel signal of the predetermined pixel is inputted to the additive correction portion, using information of the position of the correction information storage portion, the additive correction portion performs additive correction that adds to the pixel signal a predetermined proportion of a pixel signal value of the pixel that is determined to be the white-spot pixel.

4. The image pickup apparatus according to claim 3, further comprising:
   a determination portion that determines whether or not a signal value of a pixel signal of the adjacent pixel that is outputted one pixel after the pixel that is determined to be the white-spot pixel is in a range in which the pixel signal should be corrected using a threshold value; and
   an adjacent pixel correction portion that, in a case where the determination portion determines that correction should be performed, performs correction that replaces the pixel signal of the adjacent pixel with an average value of pixel signals of two pixels that are adjacent to the adjacent pixel in a direction that is orthogonal to the predetermined direction.

5. The image pickup apparatus according to claim 4, wherein the determination portion performs the determination by comparing the signal value of the pixel signal of the adjacent pixel and a value obtained by multiplying the average value of the pixel signals of the two pixels that are adjacent to the adjacent pixel by a predetermined coefficient as the threshold value.

6. The image pickup apparatus according to claim 3, wherein with respect to a single pixel that is determined to be the white-spot pixel, the correction information storage portion previously stores as the correction information, a plurality of positions including a first position and a second position as positions of the predetermined pixels, and a first coefficient and a second coefficient that show the predetermined proportions in correspondence with the first position and the second position; and the additive correction portion performs the additive correction with respect to each of the predetermined pixels at the first position and the second position using values obtained by multiplying the first coefficient and the second coefficient by the pixel signal value of the pixel that is determined to be the white-spot pixel.

7. The image pickup apparatus according to claim 3, comprising:

an endoscope that comprises the image pickup device, the white spot positional information storage portion, and the correction information storage portion, and through which the cable that has one end connected to the image pickup device is inserted; and a signal processing apparatus to which the other end of the cable is detachably connected and which comprises the image pickup device drive portion and the white spot correction portion.

8. The image pickup apparatus according to claim 1, comprising:

a correction information storage portion that previously stores correction information of a position of the predetermined pixel that is outputted the predetermined number of pixels after the pixel that is determined to be the white-spot pixel and the predetermined proportion;

wherein, at a timing at which a pixel signal of the predetermined pixel is inputted to the additive correction portion, using information of the position of the correction information storage portion, the additive correction portion performs additive correction that adds to the pixel signal a predetermined proportion of a pixel signal value of the pixel that is determined to be the white-spot pixel.

9. The image pickup apparatus according to claim 8, further comprising:

a determination portion that determines whether or not a signal value of a pixel signal of the adjacent pixel that is outputted one pixel after the pixel that is determined to be the white-spot pixel is in a range in which the pixel signal should be corrected using a threshold value; and an adjacent pixel correction portion that, in a case where the determination portion determines that correction should be performed, performs correction that replaces the pixel signal of the adjacent pixel with an average value of pixel signals of two pixels that are adjacent to the adjacent pixel in a direction that is orthogonal to the predetermined direction.

10. The image pickup apparatus according to claim 9, wherein the additive correction portion is provided on a preceding stage side of the white spot correction portion, and the white spot correction portion performs the white spot correction with respect to a pixel signal after the pixel signal is subjected to additive correction by the additive correction portion.

11. The image pickup apparatus according to claim 8, wherein the additive correction portion is provided on a preceding stage side of the white spot correction portion, and the white spot correction portion performs the white spot correction with respect to a pixel signal after the pixel signal is subjected to additive correction by the additive correction portion.

12. The image pickup apparatus according to claim 8, wherein with respect to a single pixel that is determined to be the white-spot pixel, the correction information storage portion previously stores as the correction information, a plurality of positions including a first position and a second position as positions of the predetermined pixels, and a first coefficient and a second coefficient that show the predetermined proportions in correspondence with the first position and the second position; and the additive correction portion performs the additive correction with respect to each of the predetermined pixels at the first position and the second position using values obtained by multiplying the first coefficient and the second coefficient by the pixel signal value of the pixel that is determined to be the white-spot pixel.

13. The image pickup apparatus according to claim 1, comprising:

an endoscope that comprises the image pickup device and the white spot positional information storage portion, and through which the cable that has one end connected to the image pickup device is inserted; and a signal processing apparatus to which the other end of the cable is detachably connected and which comprises the image pickup device drive portion and the white spot correction portion.

* * * * *